United States Patent
Schröder

(10) Patent No.: US 11,358,176 B2
(45) Date of Patent: Jun. 14, 2022

(54) SORTING DETECTION SYSTEM FOR DETECTING PASSAGE OF AN OBJECT THROUGH ONE OF A PLURALITY OF APERTURES

(71) Applicant: SICK AG, Waldkirch (DE)

(72) Inventor: Robert Schröder, Waldkirch (DE)

(73) Assignee: SICK AG, Waldkirch (DE)

( * ) Notice: Subject to any disclaimer, the term of this patent is extended or adjusted under 35 U.S.C. 154(b) by 194 days.

(21) Appl. No.: 16/814,055

(22) Filed: Mar. 10, 2020

(65) Prior Publication Data
US 2020/0290092 A1    Sep. 17, 2020

(30) Foreign Application Priority Data
Mar. 11, 2019 (EP) ..................... 19161801

(51) Int. Cl.
*B07C 3/18* (2006.01)
*B07C 3/08* (2006.01)
*B07C 3/14* (2006.01)
*G06K 7/14* (2006.01)

(52) U.S. Cl.
CPC ............. *B07C 3/18* (2013.01); *B07C 3/08* (2013.01); *B07C 3/14* (2013.01); *G06K 7/14* (2013.01); *B07C 2301/0016* (2013.01)

(58) Field of Classification Search
CPC .... B07C 3/18; B07C 3/08; B07C 3/14; B07C 2301/0016; B07C 7/005; G06K 7/14
USPC ........................................................ 209/583
See application file for complete search history.

(56) References Cited

U.S. PATENT DOCUMENTS

| | | | | |
|---|---|---|---|---|
| 7,516,848 | B1* | 4/2009 | Shakes | B07C 5/38 |
| | | | | 271/223 |
| 7,721,964 | B2* | 5/2010 | Reichenbach | B07C 3/14 |
| | | | | 235/454 |
| 9,191,567 | B2* | 11/2015 | Gehring | G06K 7/10722 |
| 9,193,534 | B2* | 11/2015 | Gehring | B65G 43/08 |
| 9,609,194 | B2* | 3/2017 | Egger | G06V 10/141 |
| 10,065,807 | B1* | 9/2018 | Garrett | B07C 5/36 |

(Continued)

OTHER PUBLICATIONS

European Search Report dated Sep. 2, 2019 corresponding to application No. 19161801.6-1014.

*Primary Examiner* — Gene O Crawford
*Assistant Examiner* — Muhammad Awais
(74) *Attorney, Agent, or Firm* — Nath, Goldberg & Meyer; Jerald L. Meyer

(57) ABSTRACT

In order to detect a correct sorting and a correct passing of an object through an assigned opening of a plurality of openings, a sorting detection system for detecting a passage of the object through the opening of the plurality of openings is provided. Each opening is assigned to a container. The containers receive the object; at least a first sensor identifies the object and generates an identification signal. A control unit receives the identification signal of the first sensor and assigns the identified object to a container based on the identification signal. At least one second sensor having a field of view directed towards the openings and includes at least one detection surface. The detection surface is located within the respective container at a predetermined distance from an edge of a respective opening, and an object passing the detection surface triggers a detection signal of the second sensor.

12 Claims, 2 Drawing Sheets

(56) References Cited

U.S. PATENT DOCUMENTS

2007/0237382 A1* 10/2007 Nuebling .................. B07C 3/14
382/141
2009/0039157 A1* 2/2009 Reichenbach ....... G06V 10/147
235/436
2014/0036135 A1* 2/2014 Gehring ............. H04N 5/23212
348/345

* cited by examiner

SORTING DETECTION SYSTEM FOR DETECTING PASSAGE OF AN OBJECT THROUGH ONE OF A PLURALITY OF APERTURES

FIELD

The present invention relates to a sorting detection system which detects the passage of an object through one of several openings.

BACKGROUND

Letter and parcel service providers sort objects containing letters, packages or parcels into a large number of containers, each with its own opening. After identification, the objects are transported manually or automatically in the direction of the respective openings of the containers assigned to the identified objects, so that the objects fall into the respective containers intended for the objects. This sorts the objects into the containers.

However, this sorting has the disadvantage that the object cannot be reliably and unambiguously detected when it passes through the opening of the assigned container provided for the object, so that an incorrect sorting of the object or an object falling into an incorrect container can occur unnoticed.

Incorrect sorting can occur, for example, when the object being transported hits an edge between two openings and then falls through the wrong opening into the wrong container. It can also occur, for example, if operating personnel incorrectly identify the object or move it in the direction of an incorrect container.

It is therefore an objective of the present invention to improve a sorting detection system of the type mentioned above in such a way that a correct sorting or correct passing of the object through the intended opening is reliably detected.

SUMMARY

The objective is solved according to the invention by a sorting detection system. Here, the sorting detection system comprises detecting passage of an object through one of a plurality of openings, each opening being assigned to a container, the containers for receiving the object, at least one first sensor which identifies the object and generates an identification signal, a control unit which receives the identification signal of the first sensor and assigns the identified object to a container on the basis of the identification signal, and at least one second sensor having a field of view which is directed towards the openings and comprises at least one detection surface, wherein the detection surface lies within the respective container at a predetermined distance from an edge of a respective opening, and an object passing through the detection surface triggers a detection signal of the second sensor.

Here, the sorting detection system comprises detecting passage of an object through one of a plurality of openings, each opening being assigned to a container, the containers for receiving the object, at least one first sensor which identifies the object and generates an identification signal, a control unit which receives the identification signal of the first sensor and assigns the identified object to a container on the basis of the identification signal, and at least one second sensor having a field of view which is directed towards the openings and comprises at least one detection surface, wherein the detection surface lies within the respective container at a predetermined distance from an edge of a respective opening, and an object passing through the detection surface triggers a detection signal of the second sensor.

The invention has the advantage that an object transported through the opening can be assigned exactly to the container belonging to the opening. In other words, if the object hits an edge between two openings, the inventive sorting detection system can determine exactly through which opening, or in which container belonging to the opening, the object finally fell after the object has passed the detection surface inside the container.

By parameterizing the detection area below the edge of the openings, it is ensured that an irreversible entry of the object into the respective container is detected. In this context, parameterization of the detection area means that the operating personnel can freely define a depth of the detection area within the containers or below the openings as required for setting up the sorting detection system, so that, for example, even a larger object only triggers the detection signal if it is already so far below the opening and thus inside the container that it can only fall within this container.

According to a preferred embodiment, the first sensor includes a scanner, barcode reading sensor, 2D camera or RFID reader and the second sensor includes a 3D Time of Flight (TOF) system, 3D stereo camera, 3D stereo camera combined with structured light, or 3D laser scanner. The selected sensors have a field of view that can be very easily parameterised or adjusted so that the detection area can be clearly defined within the containers.

According to another preferred embodiment, the control unit activates a visual indicator on the assigned container based on the identification signal, or a projector indicates the assigned opening to visually indicate the assignment of the identified object to the respective container. This allows a clear visual reference between the identified object and the assigned container to be provided for the operating personnel. Advantageously, the control unit evaluates the identification signal and the detection signal to produce a first sorting signal representative of correct sorting of the object into a container assigned to the object when the object triggers the detection signal in a container assigned to it. Furthermore, it is advantageous that the control unit evaluates the identification signal and the detection signal in order to generate a second sorting signal representing a wrong sorting of the object when the object triggers the detection signal in a container other than the one assigned to it. Preferably, the control unit activates an optical indicator on the container picking up the object based on the sorting signal, or a projector indicates the respective opening of the container picking up the object based on the sorting signal, in order to optically indicate the sorting of the object in this container as correct or wrong.

This not only gives the operating personnel the optical option of tracking the sorting of the identified object, but the sorting detection system also provides the operating personnel with the option of reversing the wrong sorting by means of simple optical tracking and reliable detection of a possible wrong sorting of the object. The first sorting signal can, for example, trigger the activation of a green lamp and the second sorting signal can, for example, trigger the activation of a red lamp.

Furthermore, according to a preferred embodiment, the object can be transported manually or automatically in the direction of the assigned container after identification. This enables fast and error-proof sorting of the objects under secure monitoring by the sorting detection system. Preferably the container belongs to a logistics rack with several containers arranged on the same level or on different levels to each other. This means that the sorting detection system enables room-covering monitoring of all openings of the containers, so that a flexible arrangement of the second sensor in relation to the containers is possible.

Furthermore, in accordance with a preferred embodiment, the second sensor is designed in such a way that the object conveyed through the field of view can be identified with it. This makes it advantageously possible for the object to be identified by the second sensor. This means that the identification of the object by the first sensor can either be checked or, if the identification failed for whatever reason, can be carried out by the second sensor.

According to another preferred embodiment, the openings are arranged at different distances to the second sensor, with the advantage that the second sensor is set in such a way that each container has its individually set detection surface. This provides a high degree of flexibility for an arrangement of the second sensor in relation to the containers, so that it is easier to set up the sorting detection system or integrate the sorting detection system into an existing logistics warehouse. In particular, the individual detection surfaces have the same or different distances to the opening of their respective containers compared to each other, which provides a high degree of flexibility in the parameterization of the sorting detection system or the detection surface.

Advantageously, the detection surface of the second sensor forms a plane, two-dimensional plane, so that a simple alignment of the second sensor to the openings of the containers is possible.

Furthermore, according to a preferred embodiment, it is possible to identify the object by means of an optical marker, in particular a barcode, on the object, a structural feature of the object and/or an RFID chip on the object. This ensures fast and reliable identification of the object by the first and/or second sensor.

The system according to the invention can be designed in a similar way by further features and shows similar advantages.

BRIEF DESCRIPTION OF THE DRAWINGS

The invention is also explained below with regard to further advantages and features by reference to the attached drawing using examples of execution. The figures of the drawing show in.

DETAILED DESCRIPTION

Figure 1:
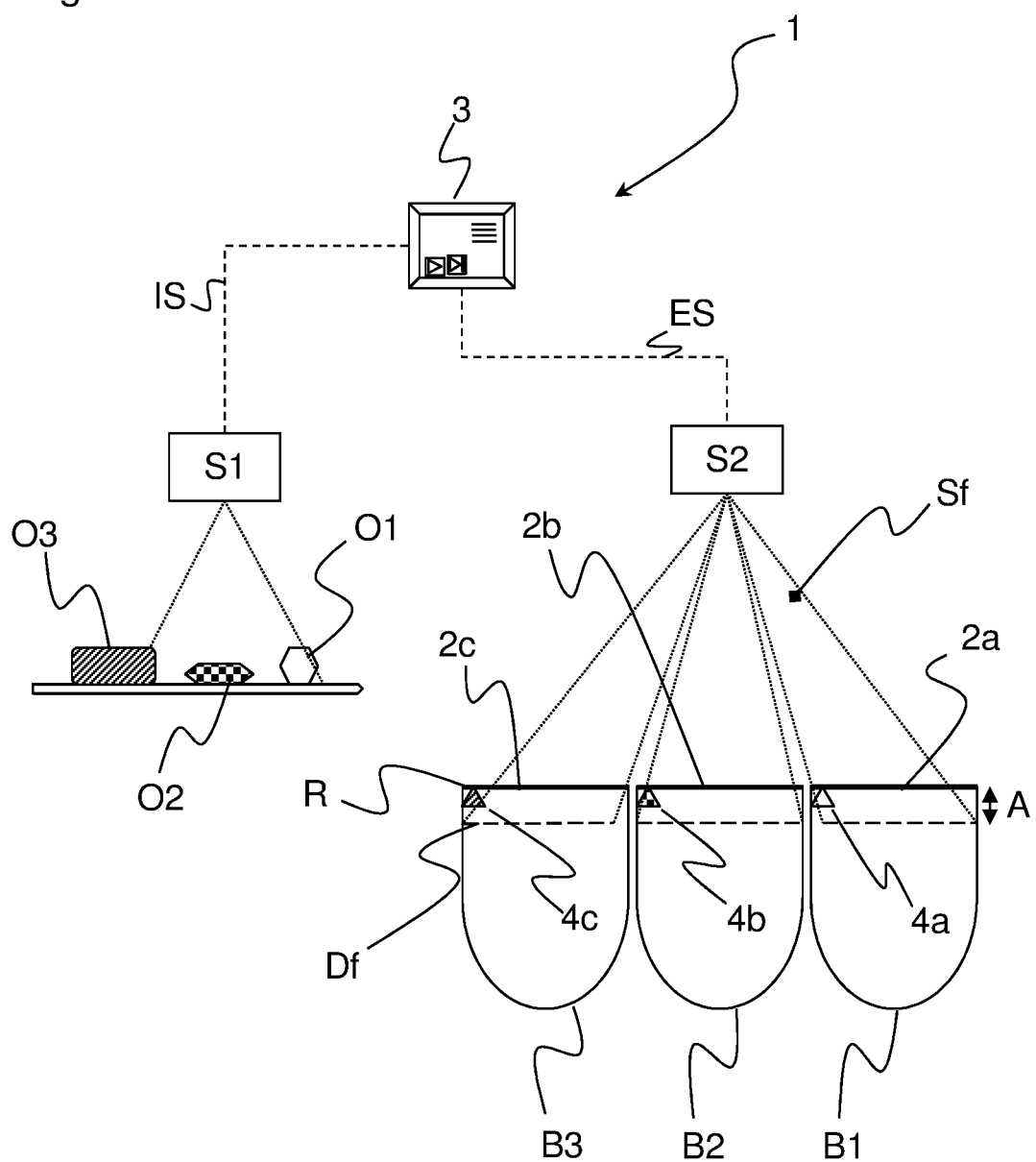
FIG. 1 a schematic representation of a first preferred embodiment of an inventive sorting detection system, and FIG. 2 a schematic representation of a second preferred embodiment of the inventive sorting detection system.

FIG. 1 schematically shows a first preferred embodiment of a sorting detection system 1 according to invention with which objects O1 to O3 are sorted into containers B1 to B3 corresponding to the respective objects O1 to O3. Objects O1 to O3, for example, represent postal deliveries that are to be sorted into delivery containers assigned to postal codes. Objects O1 to O3 could also be different industrially manufactured parts, which are also sorted into correspondingly provided parts containers.

Each container B1, B2 and B3 has in each case an opening 2a, 2b and 2c with an edge R, wherein the containers B1 to B3 are arranged side by side on a same plane, so that the openings 2a to 2c form a field with several passage possibilities to the containers B1 to B3 for the objects O1 to O3.

The sorting detection system 1 comprises at least one first sensor S1 which is intended to identify the incoming objects O1 to O3 and to generate a corresponding identification signal IS in each case. Advantageously, the first sensor S1 identifies the objects O1 to O3 by means of an optical marker, for example a barcode, on the object O1, O2 and O3, a structural feature of the object O1, O2 and O3 or an RFID chip on the object O1, O2 and O3. For a very reliable identification of the objects O1 to O3, the optical marker and the structural characteristic could also be detected simultaneously, so that a comparison between the two detections would be possible.

Either the identification of the objects O1 to O3 can be carried out automatically as shown or manually, whereby in the case of manual identification, operating personnel holds objects O1 to O3, for example, under the first sensor S1 and then moves them on in the direction of containers B1 to B3.

The first sensor S1 transmits the identification signal IS to a control unit 3, which receives the identification signal IS of the first sensor S1 and assigns the identified object O1, O2 and O3 to a container B1, B2 and B3 on the basis of the identification signal IS. Here, the control unit 3 preferably activates an optical display 4a, 4b and 4c on the associated container B1, B2 and B3 on the basis of the identification signal IS or the completed assignment, so that the assignment of the object O1 to be sorted in as the next object to the corresponding container B1 is also optically recognisable. This means, for example, that display 4a on the container B1 intended for the identified object O1 lights up, while displays 4b and 4c on the other containers B2 and B3 remain switched off.

In this context, the control unit 3 comprises, for example, a programmable memory unit, a so-called "electronic control unit ECU" or "central processing unit CPU".

After identifying and assigning objects O1 to O3, objects O1 to O3 are transported in the direction of the respective containers B1 to B3, whereby the transport can be automated or carried out manually.

At least one second sensor S2 with a field of view Sf is provided which is arranged in the direction of the containers B1 to B3 in such a way that the field of view Sf is directed towards the openings 2a to 2c of the containers B1 to B3 and comprises at least one detection surface Df. The field of view Sf captures a three-dimensional (3D) space in particular.

In accordance with the invention, the second sensor S2 is set such that the detection surface Df of the second sensor S2 lies within the respective container B1, B2 and B3 at a predetermined distance A from an edge R of a respective opening 2a, 2b and 2c. In particular, the detection surface Df forms a straight two-dimensional (2D) plane within the containers B1 to B3.

This means that the second sensor S2 detects the object O1, O2 and O3 not only up to the edge R of the openings 2a to 2c of the containers B1 to B3, but also after the respective openings 2a, 2b and 2c, if the object O1, O2 and O3 is already inside the containers B1, B2 and B3.

Accordingly, an object O1, O2 and O3 passing the detection surface Df triggers a detection signal ES of the second sensor S2. Thus the objects O1, O2 and O3 are counted exactly in the respective containers B1, B2 and B3 and are correctly assigned to them.

The control unit 3 preferably evaluates the identification signal IS and the detection signal ES and generates a first sorting signal which reproduces a correct sorting of the object O1, O2 and O3 in the associated container B1, B2 and B3 if the object O1, O2 and O3 in a container B1, B2 and B3 associated with it triggers the detection signal ES.

This means that if, for example, object O1 is identified and assigned to container B1, the detection signal ES of the second sensor S2 must be triggered by object O1 in container B1 so that control 3 generates the first sorting signal for correct sorting. Here, the first sorting signal preferably triggers a green light on the A1 display of container B1.

If the generated detection signal ES is triggered by the object O1 in a container B2 or B3 other than the container B2 or B3 assigned to it, then the control unit 3 generates a second sorting signal which represents an incorrect sorting of the object O1, preferably the second sorting signal triggering a red light on the display A2 or A3 of the container B2 or B3.

In particular, as shown in this example, the detection area Df of the second sensor S2 is divided into three areas by the three containers B1 to B3, each area being clearly assignable to the respective container B1 to B3. By passing object O1, O2 and O3 through one of the three areas of the detection area Df, the control unit 3 can precisely assign the input of object O1, O2 and O3 to the respective container B1, B2 or B3.

This ensures a reliable detection of a correct or incorrect sorting of the objects O1 to O3 to the respective assigned containers B1 to B3 and a simple tracing of an incorrect sorting by the optical display 4a to 4c is feasible.

Figure 2:
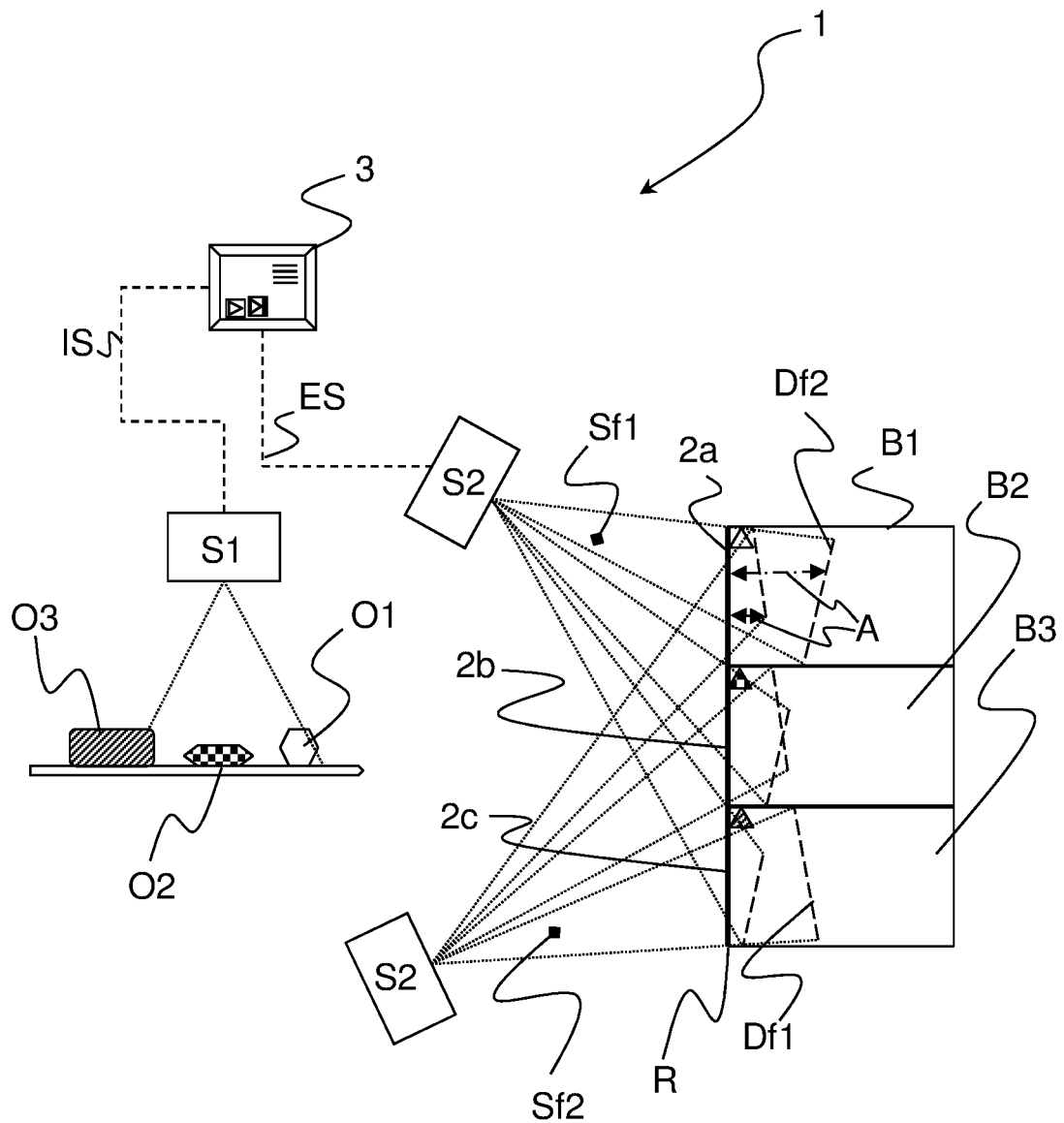

FIG. 2 schematically shows a second preferred embodiment of the sorting detection system 1. In this embodiment, the containers B1 to B3 belong to a logistics rack, which are arranged on different levels to each other. The same elements as in the first example are provided with the same reference signs and are not described in detail below.

In this embodiment, two second sensors S2, which are arranged at different angles to the containers B1 to B3, are directed in particular at the containers B1 to B3. As a result, two fields of view Sf1 and Sf2 are directed through the two second sensors S2 to the openings 2a to 2c of the containers B1 to B3. Each field of view Sf1 and Sf2 has a detection area Df1 and Df2, respectively, which are arranged at different angles to the openings 2a to 2c of the containers B1 to B3.

The objects O1 to O3 are identified by the first sensor S1, as described in the previous embodiment, so that the control unit 3 assigns the identified object O1, O2 and O3 to the respective container B1, B2 or B3 on the basis of the identification signal IS.

As can be seen from FIG. 2, the two detection areas Df1 and Df2 of the two second sensors S2 allow a complete detection of the areas after the respective openings 2a to 2c from two different angles, so that the detection areas Df1 and Df2 lie in particular in correspondingly different depths after the edge R of the openings 2a to 2c. This means that, due to the arrangement of the two second sensors S2, shading of the fields of view Sf1 and Sf2 by the structure of the containers B1 to B3 has no negative effect on the detection capability of the sorting detection system 1.

The specified distance A of the detection area Df1 and Df2 to the edge R of the respective openings 2a to 2c is set to different sizes, in particular depending on a distance of the respective openings 2a to 2c to the second sensors S2.

This means that for container B1, for example, the distance A of the detection surface Df2 of the upper second sensor S2 (referred to FIG. 2) to the edge R of the opening 2a is greater than the distance A of the detection surface Df1 of the lower second sensor S2 (referred to FIG. 2), since the upper second sensor S2 is located closer to the opening 2a than the lower second sensor S2. This simplifies the parameterization of the detection areas Df1 and Df2, since the detection areas Df1 and Df2 can be specified as a straight two-dimensional (2D) plane with a defined distance to the respective second sensor S2.

In other words, every second sensor S2 is set in such a way that each container B1, B2 and B3 has its individually set partial detection area, whereby the detection areas Df1 and Df2 of the second sensor S2 result from all the partial detection areas together. The individual partial detection areas have the same or different distances A to the respective openings 2a, 2b and 2c of their respective containers B1, B2 and B3.

If the identified object O1, O2 and O3 passes the corresponding assigned opening 2a, 2b or 2c of the respective container B1, B2 or B3, the object O1, O2 and O3 triggers the detection signal ES at the upper, lower second sensor S2 or at both second sensors S2. The sorting can be evaluated based on the triggered detection signal ES. By comparing the two triggered detection signals ES, the operational readiness of the two second sensors S2 can also be checked.

This means, for example, that when object O1 enters the assigned container B1, object O1 must trigger a detection signal ES at each of the two second sensors S2 when it passes through the upper edge R of the opening 2a of the container B1, since it passes both detection surfaces Df1 and Df2. However, object O1 only triggers a detection signal ES at the upper second sensor S2 when it passes through the lower edge R of the opening 2a of container B1, since the lower second sensor S2 in this area of container B1 has a shading of its detection area Df1.

Despite the arrangement of the second sensors S2 to the containers B1 to B3, the sorting detection system 1 is thus able to reliably detect the input of the objects O1 to O3 in the respective containers B1 to B3 and to distinguish a correct or incorrect sorting of the objects O1 to O3.

In the first and second preferred embodiment of the sorting detection system 1, the second sensor S2 is preferably designed in such a way that the object O1, O2 and O3 conveyed by the field of view Sf, Sf1 or Sf2 can additionally be identified. Here, the second sensor S2 carries out the identification of the object O1, O2 and O3, like the first sensor S1, using the optical marker on the object O1, O2 and O3 and/or the structural feature of the object O1, O2 and O3. In the event that the first sensor S1 comprises an RFID reader, the objects O1, O2 and O3 are identified by means of an RFID chip on the objects O1, O2 and O3.

Thus, the identification of the objects O1, O2 and O3 can be verified by the first sensor S1.

Furthermore, the first sensor S1 comprises a scanner, a barcode reading sensor, an RFID reader or a 2D camera. The second sensor S2 comprises a 3D-Time of Flight (TOF) system, a 3D stereo camera, a 3D stereo camera in combination with structured light, or a 3D laser scanner. With this usable second sensor S2, the field of view Sf, Sf1 and Sf2 and the detection areas Df, Df1 and Df2 can be adjusted exactly and easily, so that a setup of the sorting detection system 1 can be easily carried out.

In particular, the sorting detection system 1 can be integrated into an existing sorting system with little effort.

REFERENCE SIGNS LIST 1 sorting detection system
2a, 2b, 2c opening
3 control unit
4a, 4b, 4c optical display
A preset distance B1, B2, B3 container
Df, Df1, Df2 detection area
ES detection signal
IS identification signal
O1, O2, O3 object
R edge
S1 first sensor
S2 second sensor
Sf, Sf1, Sf2 field of view

The invention claimed is:

1. A sorting detection system for detecting passage of an object through one of a plurality of openings, each openings being assigned to a container, comprising:
    the containers for receiving the object,
    at least one first sensor which identifies the object and generates an identification signal,
    a control unit which receives the identification signal of the first sensor and assigns the identified object to a container on the basis of the identification signal, and
    at least one second sensor having a field of view which is directed onto the openings and comprises at least one detection surface,
    the detection surface being located within the respective container at a predetermined distance from an edge of a respective opening, and
    an object passing the detection surface triggers a detection signal of the second sensor,
    wherein the control unit uses the identification signal to produce an optical display on the assigned container or a projector indicates the opening of the assigned container based on the identification signal in order to optically indicate the assignment of the identified object to the respective container.

2. A sorting detection system according to claim 1, wherein the first sensor comprises a scanner, a barcode reading sensor, a 2D camera or an RFID reader and the second sensor comprises a 3D Time of Flight (TOF) system, a 3D stereo camera, a 3D stereo camera in combination with structured light, or a 3D laser scanner.

3. A sorting detection system according to claim 1, wherein the control unit evaluates the identification signal and the detection signal to generate a first sorting signal representing correct sorting of the object into a container assigned to the object, when the object triggers the detection signal in a container assigned to it, or to generate a second sorting signal representing an incorrect sorting of the object when the object triggers the detection signal in a container other than that assigned to it.

4. A sorting detection system according to claim 3, wherein the control unit activates an optical display on the container containing the object based on the sorting signal, or a projector indicates the respective opening based on the sorting signal, in order to optically indicate the sorting of the object in said container as correct or incorrect.

5. A sorting detection system according to claim 1, wherein the container belongs to a logistics rack having a plurality of containers arranged on the same plane or on different planes from each other.

6. A sorting detection system according to claim 1, wherein the second sensor is designed such that the object conveyed through the field of view can be identified with it.

7. A sorting detection system for detecting passage of an object through one of a plurality of openings, each openings being assigned to a container, comprising:
    the containers for receiving the object,
    at least one first sensor which identifies the object and generates an identification signal,
    a control unit which receives the identification signal of the first sensor and assigns the identified object to a container on the basis of the identification signal, and
    at least one second sensor having a field of view which is directed onto the openings and comprises at least one detection surface,
    the detection surface being located within the respective container at a predetermined distance from an edge of a respective opening, and
    an object passing the detection surface triggers a detection signal of the second sensor,
    wherein the openings are arranged at different distances from the second sensor.

8. A sorting detection system for detecting passage of an object through one of a plurality of openings, each openings being assigned to a container, comprising:
    the containers for receiving the object,
    at least one first sensor which identifies the object and generates an identification signal,
    a control unit which receives the identification signal of the first sensor and assigns the identified object to a container on the basis of the identification signal, and
    at least one second sensor having a field of view which is directed onto the openings and comprises at least one detection surface,
    the detection surface being located within the respective container at a predetermined distance from an edge of a respective opening, and
    an object passing the detection surface triggers a detection signal of the second sensor,
    wherein the second sensor is set such that each container has its individually set detection surface.

9. A sorting detection system according to claim 8, wherein the individual detection surfaces have equal or different distances relative to each other from the opening of their respective container.

10. A sorting detection system according to claim 8, wherein each detection surface forms a plane two-dimensional plane.

11. A sorting detection system according to claim 1, wherein the identification of the object can be carried out using an optical marker, in particular a barcode on the object, a structural feature of the object and/or an RFID chip on the object.

12. A sorting detection system according to claim 9, wherein each detection surface forms a plane two-dimensional plane.

* * * * *